US009123241B2

(12) United States Patent
Grigsby et al.

(10) Patent No.: US 9,123,241 B2

(45) Date of Patent: Sep. 1, 2015

(54) GUIDED VIDEO FEED SELECTION IN A VEHICLE-TO-VEHICLE NETWORK

(75) Inventors: Travis M. Grigsby, Austin, TX (US); Steven Michael Miller, Cary, NC (US); Pamela Ann Nesbitt, Tampa, FL (US); Lisa Anne Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1874 days.

(21) Appl. No.: 12/049,471

(22) Filed: Mar. 17, 2008

(65) Prior Publication Data

US 2009/0231158 A1 Sep. 17, 2009

(51) Int. Cl.

| | |
|---|---|
| ***G06F 15/16*** | (2006.01) |
| ***G06F 15/167*** | (2006.01) |
| ***G06F 15/173*** | (2006.01) |
| ***G08G 1/0962*** | (2006.01) |
| *G08G 1/16* | (2006.01) |

(52) U.S. Cl.

CPC ................ *G08G 1/0962* (2013.01); *G08G 1/16* (2013.01)

(58) Field of Classification Search

CPC ...... H04L 65/00; H04L 61/00; B60R 16/0315

USPC ......... 709/201, 213, 217–218, 223, 225, 231, 709/238

See application file for complete search history.

(56) References Cited

U.S. PATENT DOCUMENTS

| | | | | |
|---|---|---|---|---|
| 5,621,645 | A | 4/1997 | Brady | |
| 5,825,283 | A | 10/1998 | Camhi | |
| 5,986,650 | A * | 11/1999 | Ellis et al. | 725/40 |
| 6,049,756 | A | 4/2000 | Libby | |
| 6,208,270 | B1 | 3/2001 | Dunn | |
| 6,211,907 | B1 | 4/2001 | Scaman et al. | |
| 6,593,960 | B1 | 7/2003 | Sugimoto et al. | |
| 6,608,559 | B1 | 8/2003 | Lemelson et al. | |
| 6,734,787 | B2 | 5/2004 | Ikeda | |
| 6,735,152 | B2 * | 5/2004 | Sato et al. | 369/30.08 |
| 6,813,777 | B1 * | 11/2004 | Weinberger et al. | 725/76 |
| 6,850,269 | B2 | 2/2005 | Maguire | |
| 6,871,971 | B2 | 3/2005 | Morrison | |
| 6,937,763 | B2 * | 8/2005 | Koike et al. | 382/190 |

(Continued)

FOREIGN PATENT DOCUMENTS

WO 2005488600 A1 5/2005

OTHER PUBLICATIONS

Tracy Staedter, "Hello, from the car in front", Jun. 12, 2007, from http://www.abc.net/au/science/news/stories/2007/194084.htm.

(Continued)

*Primary Examiner* — Patrice Winder

*Assistant Examiner* — Angela Widhalm

(74) *Attorney, Agent, or Firm* — Jordan IP Law, LLC

(57) ABSTRACT

In V2V or other networks in which multiple video feeds are available to a participant, the participant's ability to select a particular video feed for display can be eased through the use of guided scanning. A guided scanning strategy is built based on operator inputs and used to select a particular set of video feeds that are initially shown as a video "slideshow" on the display used by the participant. Each video feed appears only for a limited period of time to enable easy participant review. Once the participant sees a particular video feed of interest, that video feed to can be selected for persisted presentation on the display.

14 Claims, 9 Drawing Sheets

(56) References Cited

U.S. PATENT DOCUMENTS

| | | | | |
|---|---|---|---|---|
| 6,965,604 | B1 * | 11/2005 | Sato et al. | 370/401 |
| 7,034,668 | B2 | 4/2006 | Engelman et al. | |
| 7,100,190 | B2 * | 8/2006 | Johnson et al. | 725/105 |
| 7,174,402 | B2 * | 2/2007 | Ellerbrock et al. | 710/112 |
| 7,178,106 | B2 * | 2/2007 | Lamkin et al. | 715/716 |
| 7,188,026 | B2 | 3/2007 | Tzamaloukas | |
| 7,193,645 | B1 | 3/2007 | Aagaard et al. | |
| 7,227,493 | B2 | 6/2007 | Oswald et al. | |
| 7,248,968 | B2 | 7/2007 | Reid | |
| 7,353,110 | B2 | 4/2008 | Kim | |
| 7,450,603 | B2 | 11/2008 | Nix et al. | |
| 7,463,138 | B2 | 12/2008 | Pawlicki et al. | |
| 7,477,758 | B2 | 1/2009 | Piirainen et al. | |
| 7,483,693 | B2 | 1/2009 | Lueng et al. | |
| 7,501,934 | B2 * | 3/2009 | Tischer | 340/384.3 |
| 7,711,699 | B2 | 5/2010 | Koromyslov et al. | |
| 7,813,822 | B1 | 10/2010 | Hoffberg | |
| 7,877,196 | B2 | 1/2011 | Lin et al. | |
| 7,938,727 | B1 * | 5/2011 | Konkle | 463/42 |
| 7,983,206 | B2 | 7/2011 | Tian | |
| 8,117,281 | B2 | 2/2012 | Robinson et al. | |
| 8,330,791 | B2 * | 12/2012 | Gorzynski et al. | 348/14.07 |
| 8,340,904 | B2 | 12/2012 | Lin | |
| 8,478,209 | B2 | 7/2013 | Bai et al. | |
| 2002/0095367 | A1 | 7/2002 | Mizunuma et al. | |
| 2002/0164962 | A1 | 11/2002 | Mankins et al. | |
| 2003/0023974 | A1 | 1/2003 | Dagtas et al. | |
| 2003/0186675 | A1 | 10/2003 | Davis et al. | |
| 2003/0210806 | A1 | 11/2003 | YoichiShinitani et al. | |
| 2004/0022416 | A1 | 2/2004 | Lemelson et al. | |
| 2004/0036622 | A1 | 2/2004 | Dukach et al. | |
| 2005/0004753 | A1 | 1/2005 | Weiland et al. | |
| 2005/0010955 | A1 | 1/2005 | Elia et al. | |
| 2005/0031169 | A1 | 2/2005 | Shulman et al. | |
| 2005/0102374 | A1 | 5/2005 | Moragne et al. | |
| 2005/0185823 | A1 | 8/2005 | Brown et al. | |
| 2005/0225634 | A1 | 10/2005 | Brunetti et al. | |
| 2005/0278088 | A1 | 12/2005 | Thorner | |
| 2006/0045115 | A1 | 3/2006 | Nix et al. | |
| 2006/0184538 | A1 | 8/2006 | Randall et al. | |
| 2006/0187305 | A1 | 8/2006 | Trivedi et al. | |
| 2007/0005795 | A1 | 1/2007 | Gonzalez | |
| 2007/0018952 | A1 * | 1/2007 | Arseneau et al. | 345/156 |
| 2007/0052856 | A1 | 3/2007 | Jung et al. | |
| 2007/0139523 | A1 | 6/2007 | Nishida et al. | |
| 2007/0159354 | A1 | 7/2007 | Rosenberg | |
| 2007/0174467 | A1 | 7/2007 | Ballou et al. | |
| 2007/0195939 | A1 * | 8/2007 | Sink et al. | 379/37 |
| 2008/0088706 | A1 | 4/2008 | Girgensohn et al. | |
| 2008/0089299 | A1 | 4/2008 | Lindsley | |
| 2008/0181132 | A1 * | 7/2008 | Underhill et al. | 370/254 |
| 2008/0199050 | A1 | 8/2008 | Koitabashi | |
| 2008/0211907 | A1 | 9/2008 | Kelly et al. | |
| 2008/0220760 | A1 | 9/2008 | Ullah | |
| 2008/0242221 | A1 * | 10/2008 | Shapiro et al. | 455/3.06 |
| 2008/0255754 | A1 | 10/2008 | Pinto | |
| 2009/0023446 | A1 * | 1/2009 | Das | 455/435.2 |
| 2009/0041300 | A1 | 2/2009 | Mack | |
| 2009/0063419 | A1 | 3/2009 | Nurminen et al. | |
| 2009/0092183 | A1 | 4/2009 | O'Hern et al. | |
| 2009/0096937 | A1 | 4/2009 | Bauer et al. | |
| 2009/0122740 | A1 * | 5/2009 | Bouazizi | 370/312 |
| 2009/0226001 | A1 | 9/2009 | Grigsby et al. | |
| 2009/0282164 | A1 * | 11/2009 | Fuehrer et al. | 709/236 |
| 2010/0131642 | A1 | 5/2010 | Chalikouras et al. | |
| 2010/0175086 | A1 | 7/2010 | Gaydou et al. | |
| 2010/0321183 | A1 * | 12/2010 | Donovan et al. | 340/540 |
| 2014/0316611 | A1 * | 10/2014 | Parente Da Silva | 701/2 |

OTHER PUBLICATIONS

Author Unknown, "Dedicated Short Range Communications," from http://en.wikipedia.org/wiki/Dedicated_Short_Range_Communications.

Final Office Action for U.S. Appl. No. 12/049,489, mailed Apr. 10, 2012, 15 pages, U.S. Patent and Trademark Office.

Non-Final Office Action for U.S. Appl. No. 12/049,436, mailed Nov. 18, 2011, 11 pages, U.S. Patent and Trademark Office.

Non-Final Office Action for U.S. Appl. No. 12/049,451, mailed Apr. 18, 2012, 20 pages, U.S. Patent and Trademark Office.

Non-Final Office Action for U.S. Appl. No. 12/049,489, mailed Oct. 7, 2011, 9 pages, U.S. Patent and Trademark Office.

Non-Final Office Action for U.S. Appl. No. 12/049,451, mailed Sep. 5, 2014, 20 pages, U.S. Patent and Trademark Office.

Final Office Action for U.S. Appl. No. 12/049,1451, mailed Nov. 6, 2012, 21 pages, U.S. Patent and Trademark Office.

Notice of Allowance for U.S. Appl. No. 12/049,451, mailed Jan. 15, 2015, 11 pages, U.S. Patent and Trademark Office.

Non-Final Office Action for U.S. Appl. No. 13/419,481, mailed Feb. 11, 2015, 22 pages, U.S. Patent and Trademark Office.

* cited by examiner

GUIDED VIDEO FEED SELECTION IN A VEHICLE-TO-VEHICLE NETWORK

CROSS-REFERENCE TO RELATED APPLICATIONS

This application is related to U.S. patent application Ser. No. 12/049,436 filed concurrently herewith, to U.S. patent application Ser. No. 12/049,451 filed concurrently herewith, to U.S. patent application Ser. No. 12/049,458 filed concurrently herewith, and to U.S. patent application Ser. No. 12/049,489 filed concurrently herewith.

BACKGROUND OF THE INVENTION

The present invention relates to vehicle-to-vehicle (V2V) networks and more particularly to guided selection of video feeds (video data streams) for presentation on a display used by a participant in such networks.

Efforts have been underway for some time to establish standards for and to develop technology that would allow drivers within limited geographic areas to "talk" to each other by participating in ad hoc vehicle-to-vehicle networks in which audio, video and other data is shared among participating vehicles. It is envisioned that each vehicle participating in such a vehicle-to-vehicle network would be equipped with video cameras for capturing video data both for use within the participating vehicle and for sharing with other vehicles participating in the network as well as microphones for capturing audio data that could be shared directly with other vehicles independently of existing communications networks, such as cellular telephone networks.

According to one proposal, data would be shared among vehicles using a Dedicated Short Range Communications (DSRC) wireless protocol operating in the 5.9 Gigahertz band that would support direct vehicle-to-vehicle communications over a relatively short range (100 meters-300 meters). The effective size of the network implemented using the DSRC would be significantly greater than the direct vehicle-to-vehicle maximum range, however, since each vehicle could relay data received from another vehicle to still other vehicles within its range. Relayed data could "hop" one vehicle at the time to vehicles progressively further away from the vehicle that was the source of the data.

Vehicle-to-vehicle networks will serve the general purpose of making participating drivers more aware of what is happening around them as well as a number of specific purposes, including safety-related purposes. Such networks would permit drivers to alert other drivers of traffic slowdowns, road hazards and approaching emergency vehicles. Such networks could also enable emergency vehicle personnel to alert drivers to their presence, letting alerted drivers anticipate the appearance of the emergency vehicles and more quickly clear paths for them.

While giving a participating driver the chance to select any of the many video feeds that may exist in a vehicle-to-vehicle network at any given time clearly can be useful to the participating driver, there is a concern that a driver will become distracted by having to select and then review each available video feed and that the distraction will give rise to risks that the vehicle-to-vehicle network was supposed to eliminate or reduce in the first place. There is a need to enable a driver to guide the selection of a desired video feed without necessarily reviewing every available video feed.

BRIEF SUMMARY OF THE INVENTION

The present invention may be enabled as a method to be used in a vehicle-to-vehicle network in which multiple participating vehicles include video cameras producing video data that may be shared among all participating vehicles. The method enables a user of one of the participating vehicles to perform a guided selection of the desired video feed from the available plurality of video feeds. A user-designated viewing strategy including at least one defined view property is received. Each stream having the defined view property is selected for presentation on an in-vehicle display for a limited period of time for review by the user.

The present invention may also be implemented as a computer program product that enables a user of a participating vehicle in a vehicle-to-vehicle network to perform a guided selection of a desired video feed from among the plurality of video feeds shared among multiple participating vehicles in the network. The computer program product includes a computer usable medium embodying computer usable program code configured to receive a user-designated viewing strategy comprising at least one defined view property, to select each video feed processing the defined view property, and to present each selected video feed on an in-vehicle display for a limited period of time for review by the user.

The present invention may also be implemented in a video selection system including a user input system for receiving a user-a designated viewing strategy including at least one defined view property, a view selection system for selecting, from among the plurality of available video feeds, each video feed possessing the defined view property, and display control logic for presenting each selected video feed on an in-vehicle display for a limited period of time for review by the user.

DETAILED DESCRIPTION OF THE INVENTION

Figure 1:
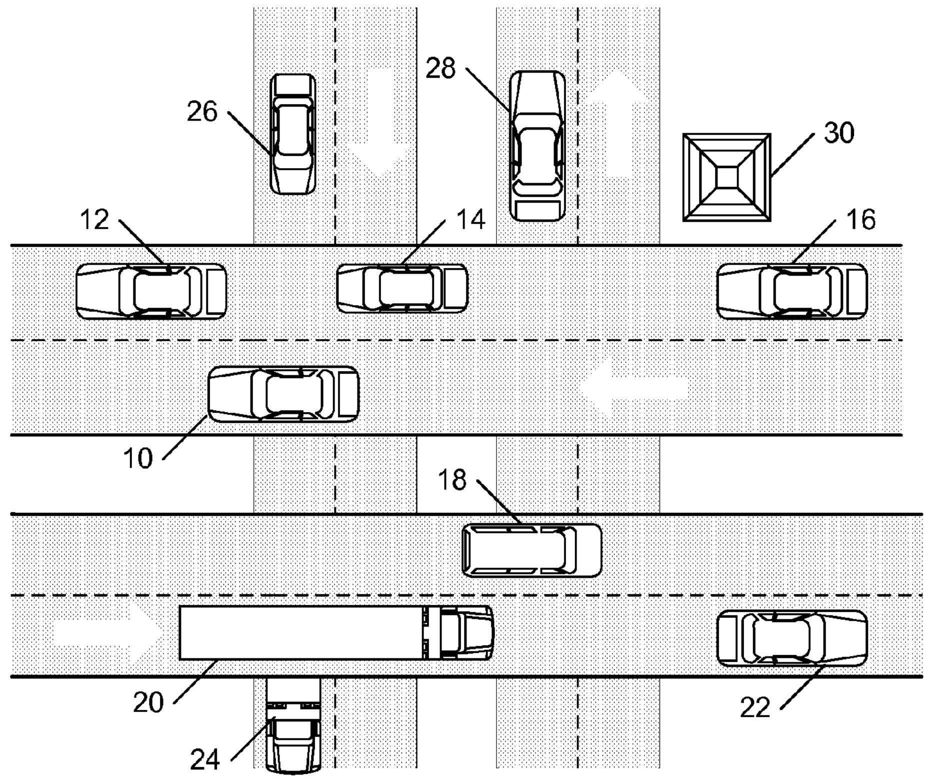
FIG. 1 is an illustration of several roadways traveled by cars and trucks that could participate in a vehicle-to-vehicle network of the type in which the present invention may be implemented.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1 and assuming that all of the vehicles shown there are properly equipped, any of the vehicles, such as car 10, may elect to participate in an ad hoc vehicle-to-vehicle (V2V) network including not only car 10 but also cars 12, 14, and 16 that are traveling in the same direction as car 10, cars 18 and 22 and tractor-trailer 20 that are traveling in the opposite direction and even cars 26 and 28 and truck 24 that are traveling orthogonally to car 10. Being a participant in a V2V network means that each participating vehicle will be able to share both locally generated and received audio and video data as well as control data with other participating vehicles.

As a practical matter, roadside base stations, such as base station 30, may be considered participants in V2V networks by receiving data from and providing data to vehicles in the network even though the base stations obviously do not satisfy any conventional definition of the word "vehicle".

Figure 2:
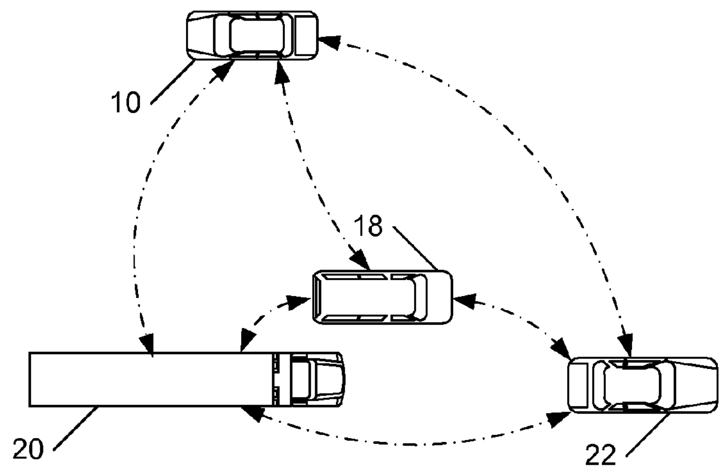
FIG. 2 is an illustration of a few of the cars and trucks that appear in FIG. 1 with additional graphics representing peer-to-peer communication paths among the vehicles.

Referring to FIG. 2, communications among participating vehicles are preferably conducted on a peer-to-peer basis that enables any vehicle in the network to wirelessly communicate directly with any other participating vehicle within a predetermined range determined by the wireless protocol implemented by the network. As noted earlier, the Dedicated Short Range Communications wireless protocol developed for automotive applications has an effective range on the order of 100 to 300 meters, which would be sufficient to enable car 10 to communicate directly with at least cars 18 and 22 and tractor-trailer 20 along with other nearby vehicles (not shown).

The size of the ad hoc network from the perspective of car 10 (or any other participant in the network) is not limited to vehicles with which car 10 may communicate directly. Each participating vehicle can act as a relay point, receiving data from a nearby vehicle and passing it on to other vehicles that are within the direct communication range of the relaying vehicle regardless of whether the target vehicles are beyond the direct communication range of the vehicle from which the data originated. Thus, data can radiate along chains of vehicles, only one or a few of which may be within the direct communication range of the data source.

Figure 3:
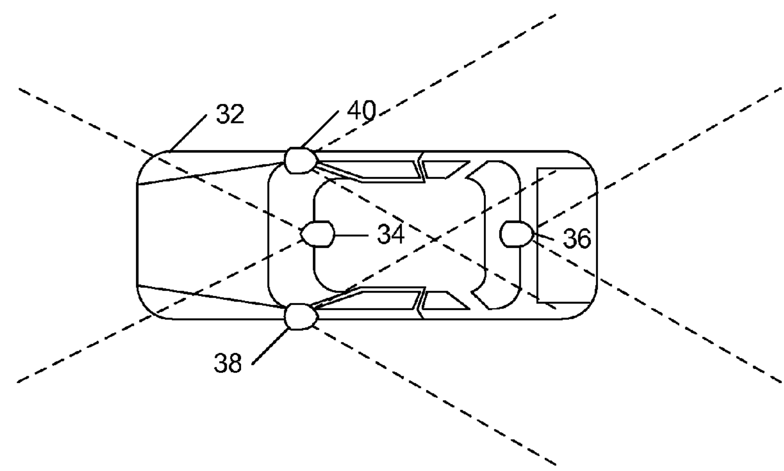
FIG. 3 is an illustration of a single vehicle showing multiple video cameras that could provide video data for use within the vehicle and sharing with other vehicles participating in the vehicle-to-vehicle network.

Referring to FIG. 3, it is assumed that any vehicle that participates in a typical V2V network will have a least one video camera, such as forward-facing video camera 34 that is mounted on or near the interior rearview mirror of vehicle 32 to provide a video field of view that approximates what the driver of vehicle 32 actually sees when seated behind the steering wheel. Video data captured by video camera 34 would probably be more useful to other participating drivers than to the driver of vehicle 32. The vehicle 32 could, of course, be equipped with additional video cameras, such as a rear-facing, trunk-mounted video camera 36 having a field of view directly behind vehicle 40 and side-mounted video cameras 38 and 40 that could be used to overcome rearview blind spots that occur when only conventional exterior rearview mirrors are used. In some cases, vehicles may be equipped with side-facing video cameras (not shown) that provide views to the left and the right of the vehicle.

Figure 4:
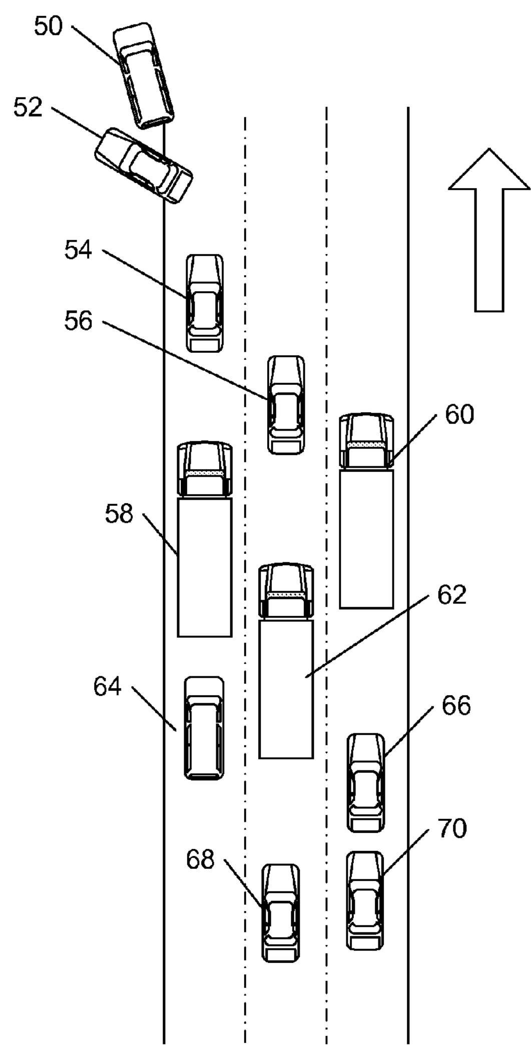
FIG. 4 is an illustration of a typical traffic scenario in which the present invention would be extremely useful to at least some of the drivers of the illustrated vehicles.

As anyone who has ever driven a motor vehicle knows, there are times that a driver will be far more interested in knowing what other drivers can see than what he can see from his own vehicle, even with the assistance of video cameras mounted on his own vehicle. FIG. 4 illustrates one of those times.

The Figure shows a small section of one side of a six lane divided highway (three travel lanes in each direction of travel) in which two vehicles 50 and 52, either as a result of an accident or breakdowns, have come to rest in or near the median strip of the highway, partially blocking the nearest travel lane. As can be expected, the disabled vehicles 50 and 52 have caused a slowdown in approaching traffic, including cars 54, 56, 62, 64, 66, 68 and 70 and tractor-trailers 58, 60 and 62. Of the vehicles on the highway, however, only car 54 and tractor-trailer 58 are likely to be able to clearly see the disabled vehicles 50 and 52 and thus have a good of idea of what is causing the slowdown. The view of every other vehicle will be blocked, at least to some extent, by other vehicles. Cars 64, 66, 68 and 70, in particular, will be completely unable to see the disabled vehicles and will have no idea what has caused the slowdown and which lanes, if any, are likely to be blocked. Without even basic information as to what is causing the slowdown, the drivers of cars 64, 66, 68 and 70 will have no idea whether they should remain in their current lanes, or attempt to merge left or right in order to get past whatever is causing the slowdown.

As noted earlier, vehicles participating in a vehicle-to-vehicle network are likely to be equipped with video cameras generating video feeds for use within the vehicle and for sharing with other vehicles participating in the network. In a situation such as the one illustrated in FIG. 4, it can be expected that drivers caught in the slowdown will be very interested in seeing the video feed that provides the clearest view of the incident causing the slowdown and thus will be spending time selecting and reviewing video feeds originating in other vehicles participating in the vehicle-to-vehicle network in an effort to find the video feed that provides the clearest view of the incident that is causing the slowdown.

While drivers could always cycle through incoming video feeds manually to identify the video feed of greatest interest to them at the moment, that would mean that each driver's attention would be focused on the selection process rather than the road ahead. It goes without saying that anything that requires that a driver focus on anything other than the road ahead can create safety problems beyond those created by the original cause of a slowdown. The present invention reduces a driver's burden through the use of a guided selection process that requires less effort from the driver in order to select the video feed currently of greatest interest to the driver. The guided selection process is carried out in a data processing system that is capable of receiving, storing and processing various kinds of data feeds (audio, video and other) originating in other vehicles participating in a vehicle-to-vehicle network.

Figure 5:
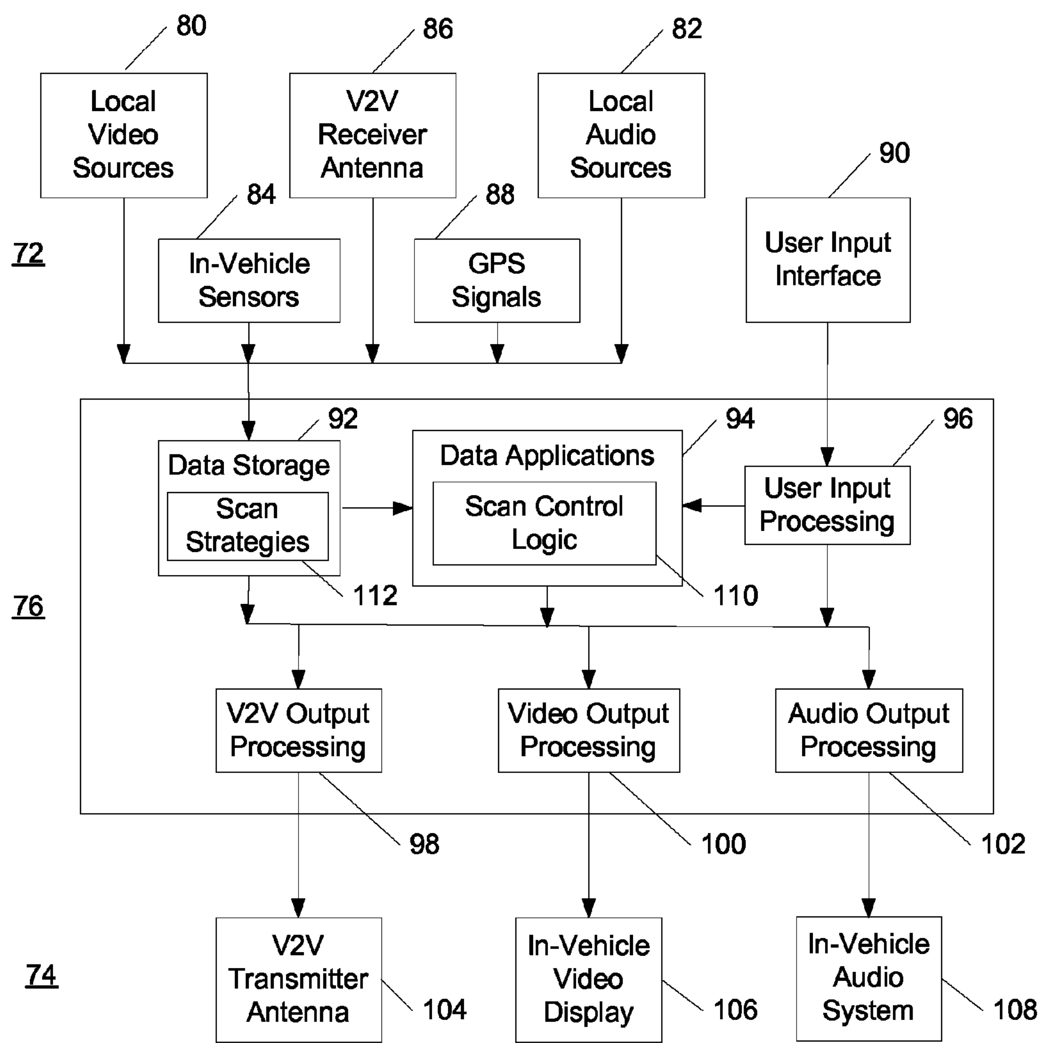
FIG. 5 is the functional block diagram of a system that could be employed to implement the present invention.

FIG. 5 is a functional block diagram of the major functional components for such a data processing system. The data processing system can be roughly divided into three major subsystems: an input subsystem 72, an output subsystem 74, and a data processing subsystem 76 that processes incoming data provided by the input subsystem 72 to provide the output data utilized by the output subsystem 74.

The input subsystem 72 includes local video sources 80 such as vehicle-mounted video cameras of the type already discussed and local audio sources 82, including such sources as dashboard-mounted microphones and wireless headsets for capturing voice input from drivers and/or passengers. Preferably, any wireless headsets would make use Bluetooth or other standardized wireless protocols. The input subsystem 72 further includes connections to in-vehicle sensors 84, an obvious example of which is the vehicle speedometer, and to a GPS or Global Positioning System subsystem 88 that provides the vehicle's current global location.

The input subsystem 72 further includes a user input interface 90 for acquiring user data and commands. The user input interface can be implemented in a number of known ways. Key input technologies, touchscreen technologies and voice recognition technologies are nonexclusive examples of technologies that can be employed to capture user input.

All of the input subsystems described above can be characterized as local subsystems in that they capture data originating at the vehicle itself. The essence of a V2V network is that each vehicle participating in the network can make use of data provided by other participating vehicles. To make that possible, the input subsystem 72 must include a V2V receiver antenna 86 to acquire audio, video and other data feeds from other vehicles participating in the V2V network.

Input data, both local and remote, is at least initially stored in a data storage subsystem 92 in the data processing subsystem 76. Stored data is retrieved from storage for use by data applications 94 that may be invoked by the vehicle driver or passengers using commands entered at the interface 90 and processed in a user input processing subsystem 96.

Output data resulting from execution of data applications in subsystem 94 may be made available to other participating vehicles through the use of a V2V output processing subsystem 98 connected to a V2V transmitter antenna 104. Depending upon the technologies employed, V2V transmitter antenna 104 and V2V receiver antenna 86 may be the same physical device. Output data may, of course, be used within the vehicle as well. Data intended for an in-vehicle video display 106 undergoes processing in a video output processing stage 100 before being directed to the display. Similarly, data intended for the in-vehicle audio system 108 is processed in an audio output processing stage 102 before being sent to the audio system.

In the illustrated data processing system, the logic for guiding a driver's selection of a particular video feed of interest at a given time resides in a scan control logic module 110 included in the data applications section 94. Scan strategies established by a driver can be stored in a scan strategies area 112 in the data storage section 92. The operations enabled by the scan control logic module 110 will be described in detail below.

Strategies for enabling a driver to perform a guided scan of available video feeds in order to more easily select the video feed of current greatest interest are established based on a series of operator inputs that define the properties of a desired feed. In one embodiment of the invention, user inputs can be captured using a touch screen device 120 of the type illustrated in each of FIGS. 6 through 10. Touch screen device 120 includes a flat screen display area 126 which can be programmed to display information and to provide programmatic "soft buttons" that can be touched by a user to make input choices.

Figure 6:
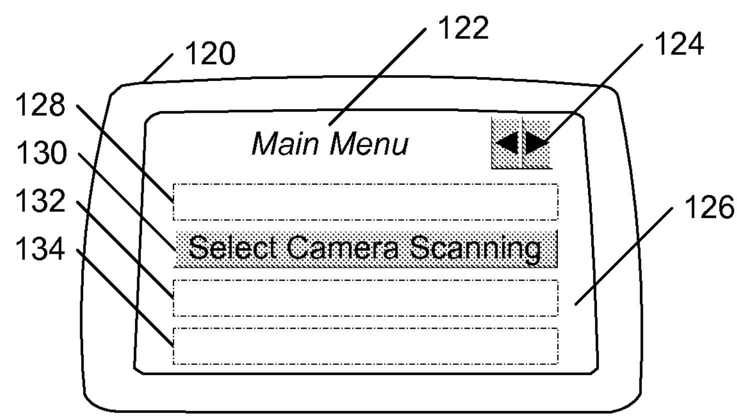
FIG. 6 is an illustration of one embodiment of a user input device showing a top top-level menu.

FIG. 6 illustrates a partial top level menu for touch screen device 120. The display area 126 of device 120 includes a header area 122 and navigation controls such as spin buttons 124 that appear on all generated menus and programmed "soft" buttons that may appear only on specific menus. The content of the header area 122 is preferably program-generated text that identifies the major function of the screen. The top-level menu screen is shown in a partially-populated state with a single soft button 130 that, when selected, allows the user to begin the process of developing a guided scanning strategy. Areas 128, 132, and 134 on the screen are simply placeholders for soft buttons associated with other major functions (not discussed) that might be selected by a user.

Figure 7:
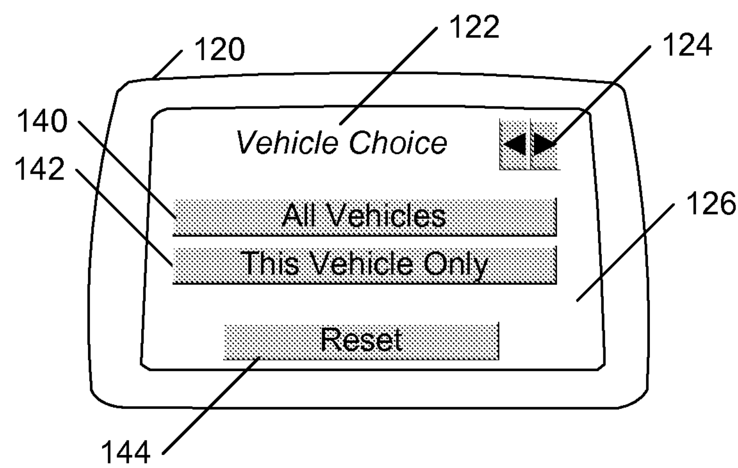
FIG. 7 illustrates the same user input device showing a second level menu.

Once a user has initiated development of a guided scanning strategy by selecting soft button 130, the user is presented with a display screen of the type shown in FIG. 7, which requires the user to specify whether the video feeds that are to be considered include those from other participating vehicles (soft button 140) or are to be limited to those generated by cameras mounted on the driver's own vehicle (soft button 142). A driver may elect to limit the video feeds to those generated by cameras mounted on his own vehicle if the driver senses that an event of interest is happening in the immediate vicinity of his vehicle but is unable to determine whether that event is occurring ahead of, to the right of, behind or to the left of the vehicle.

The screen also preferably includes a Reset soft button 144 that, when selected by the user, will return to the user to the top-level menu. The Reset button, which preferably appears on all of the menus other than the top-level menu, will always return the user to the top-level menu, from which the user may select other major functions of the data processing system or may restart the process of developing a guided scanning strategy.

Figure 8:
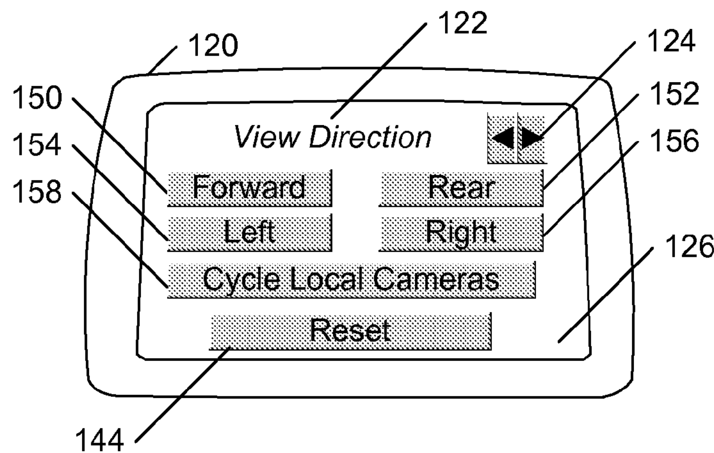
FIG. 8 illustrates the same user input device showing still another menu.
Figure 9:
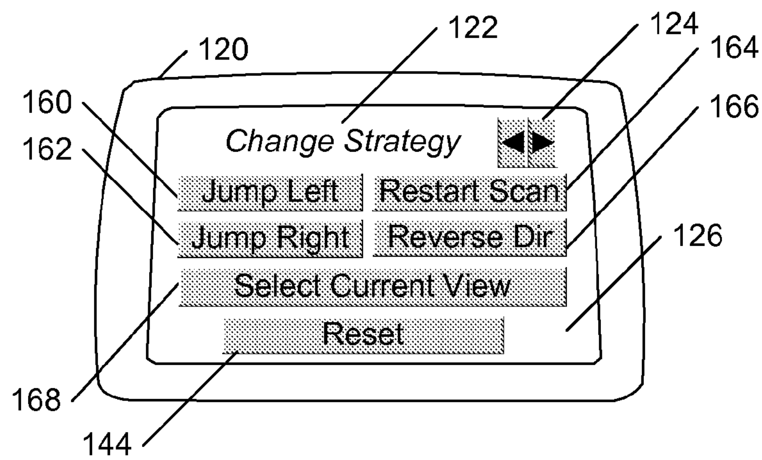
FIG. 9 illustrates the same user input device showing still another menu.

Referring to FIG. 8, once a driver decides whether all video feeds or only locally-generated video feeds are to be considered, that choice can be further refined. If the driver has specified that all video feeds to be considered, the driver may further specify whether the feeds are to be limited to those provided by vehicles in front of the driver's vehicle (soft button 150), those provided by vehicles following the driver's vehicle, those provided by vehicles to the left of the driver's vehicle (soft button 154), or those provided by vehicles to the right of the driver's vehicle (soft button 156).

If the driver specified that only locally-generated video feeds are to be considered, the driver may, by selecting Cycle Local Cameras soft button 158, immediately begin what amounts to a video "slideshow" of the locally-generated video feeds. Each locally-generated video feed will appear on the in-vehicle display for a limited period of time (on the order of 1-2 seconds) before being automatically replaced by the next locally-generated video feed. There is nothing critical about the length of the presentation interval. It only needs to be long enough to allow the user to decide whether he is interested in the video feed but yet short enough to avoid a complete display cycle that is perceived as being overly long. Preferably, the driver should be able to adjust the presentation interval to satisfy his personal preferences.

In one embodiment of the invention, a 360° video scan might be implemented by sequentially selecting video feeds from successive video cameras located along a clockwise (or counter-clockwise) path. Alternatively, a driver might want to limit the view directions to be considered so that the video slideshow would be limited to video feeds from vehicle-mounted cameras pointing in a particular direction (i.e., front, rear, left, right) relative to the direction of travel of the vehicle.

Assuming the driver had selected "All Vehicles" and had specified the view direction, the system would automatically begin the same sort of video slideshow using all remotely-generated video feeds that possess the properties previously specified by the driver. There is, of course, the possibility that the guided scan developed based on user inputs may still not show what the driver would like to see. In one embodiment of the invention, when the video slideshow begins, the user input screen automatically changes to a menu of the type shown in FIG. 9. The menu would offer the user a number of options for adjusting the video feed selection strategy.

If a driver recognized that in the event of interest was occurring to the left of views provided by a currently selected set of video feeds, the driver might select a Jump Left soft button 160 to select video feeds generated by vehicles further left. Conversely, if the event of interest was occurring to the right of the currently selected set of generated by vehicles, the driver might select a Jump Right soft button 162 to select video feeds generated by vehicles further to the right. Other driver choices may be to restart the guided scan from the beginning (soft button 164) or to reverse the order in which video feeds are being selected for display (soft button 166). Being able to reverse the order of presentation on the in-vehicle display is useful if the driver has allowed a particular video feed to disappear from the in-vehicle display but then decides he wants to examine that video feed more closely.

When the driver has decided that a particular, currently displayed video feed is the one of greatest interest to him, that video feed is selected through the use of a Select Current View soft button 168. When a particular video feed has been selected through the use of soft button 168, the video slideshow is terminated and the display of the selected video feed on the can-vehicle display is persisted. Since the camera producing the selected video feed may be (and probably is) moving relative to the incident in which the driver is interested, the possibility exists that the camera will soon cease to capture the incident.

Figure 10:
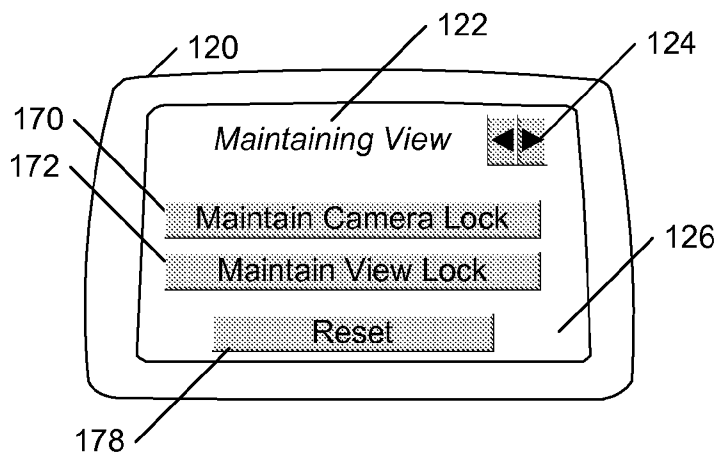
FIG. 10 illustrates the same user input device showing still another menu.

Referring now to FIG. 10, in one embodiment of the invention, the driver has one more choice to make after selecting the video feed currently of greatest interest. The driver may elect, through the use of Maintain Camera Lock soft button 170, to persist the view of the video feed from the same video camera without regard to what that video feed actually shows. Alternatively, the driver may elect to prolong the view of a particular incident through the use of Maintain View Lock soft button 172. As will be described in more detail with reference to a later figure, the system responds to selection of soft button 172 by analyzing the current video feed to identify key points or features of interest in the image and then automatically switching from camera to camera to display video feeds that display the identified key points. The automatic switching from camera to camera amounts to an effort to maintain the view originally selected as being of interest.

Figure 11A:
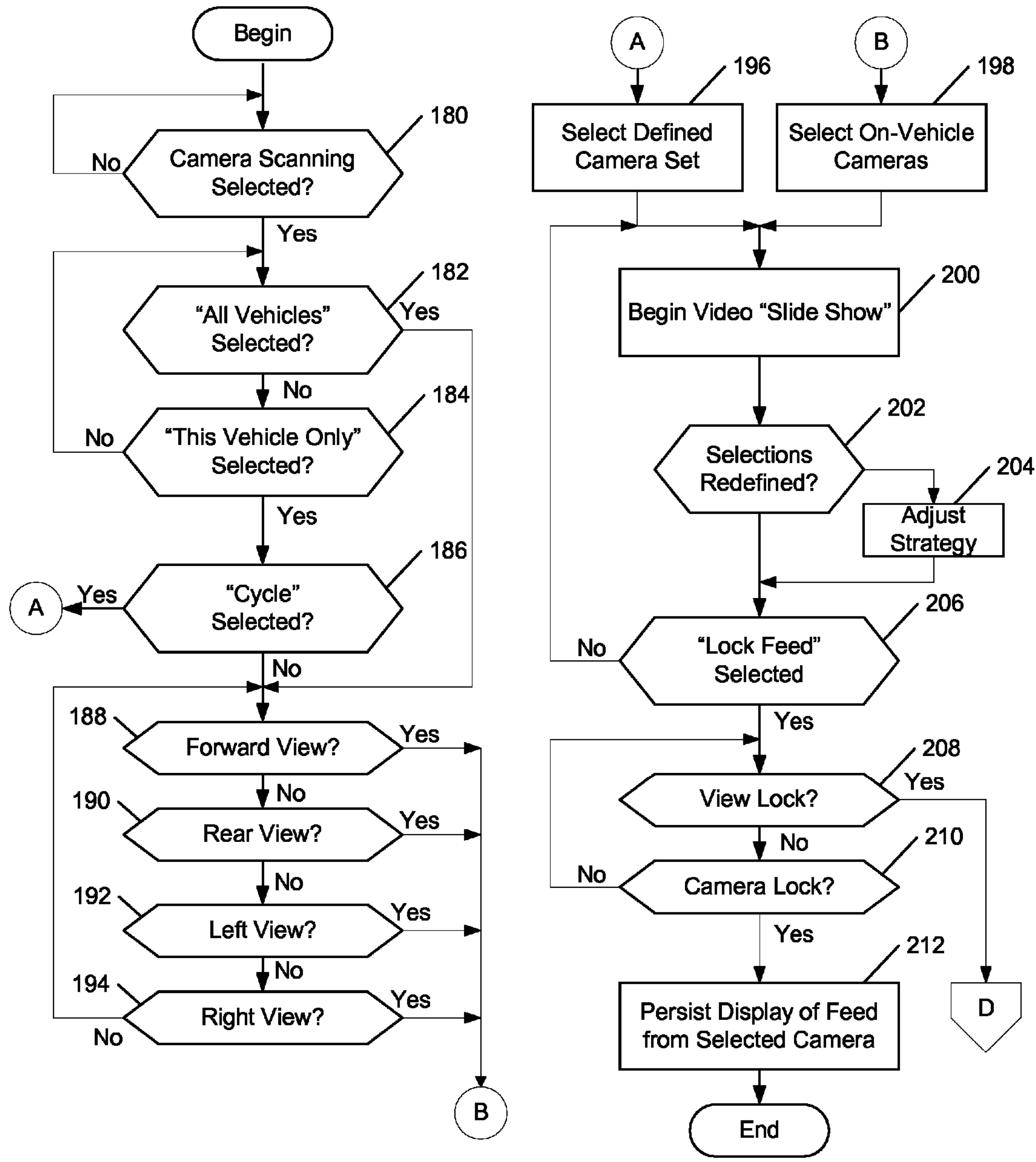
FIG. 11, consisting of FIGS. 11A, 11B and 11C, is a flow chart of operations occurring in the process for performing a guided selection of a particular video feed from a plurality of available video feeds.
Figure 11B:
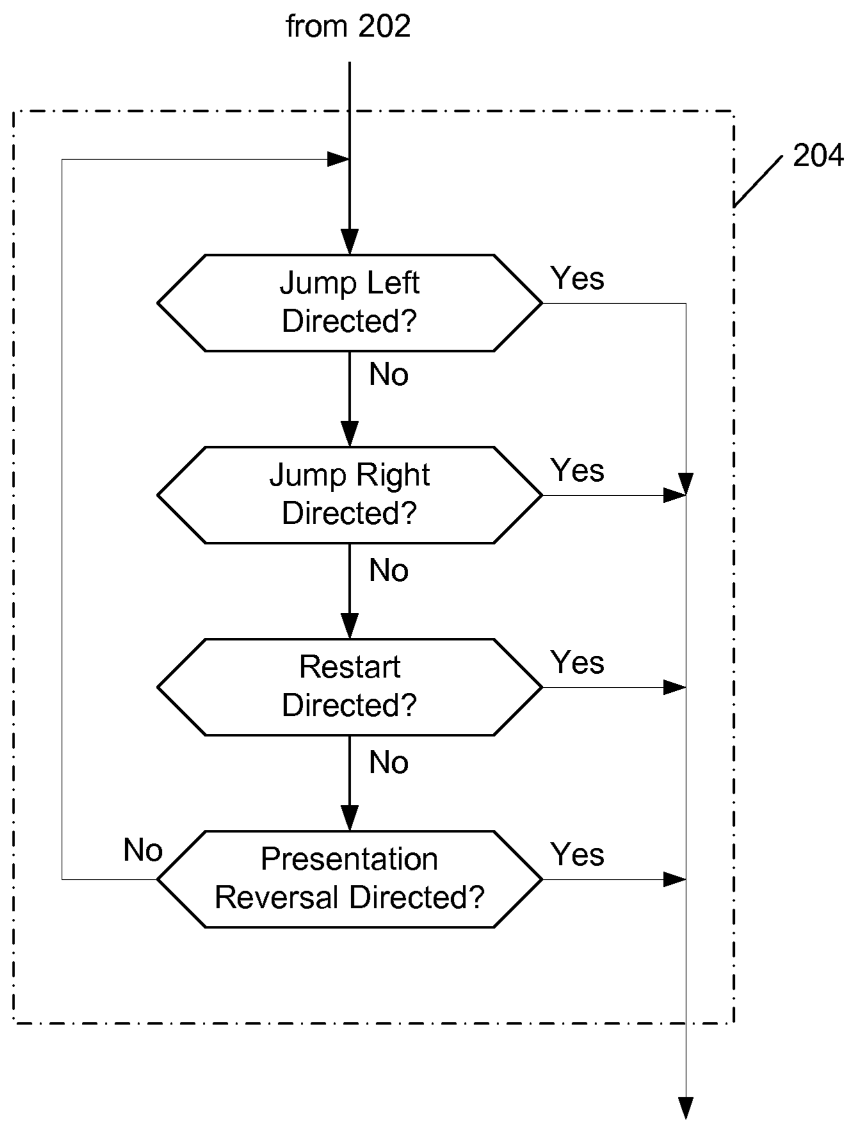
Figure 11C:
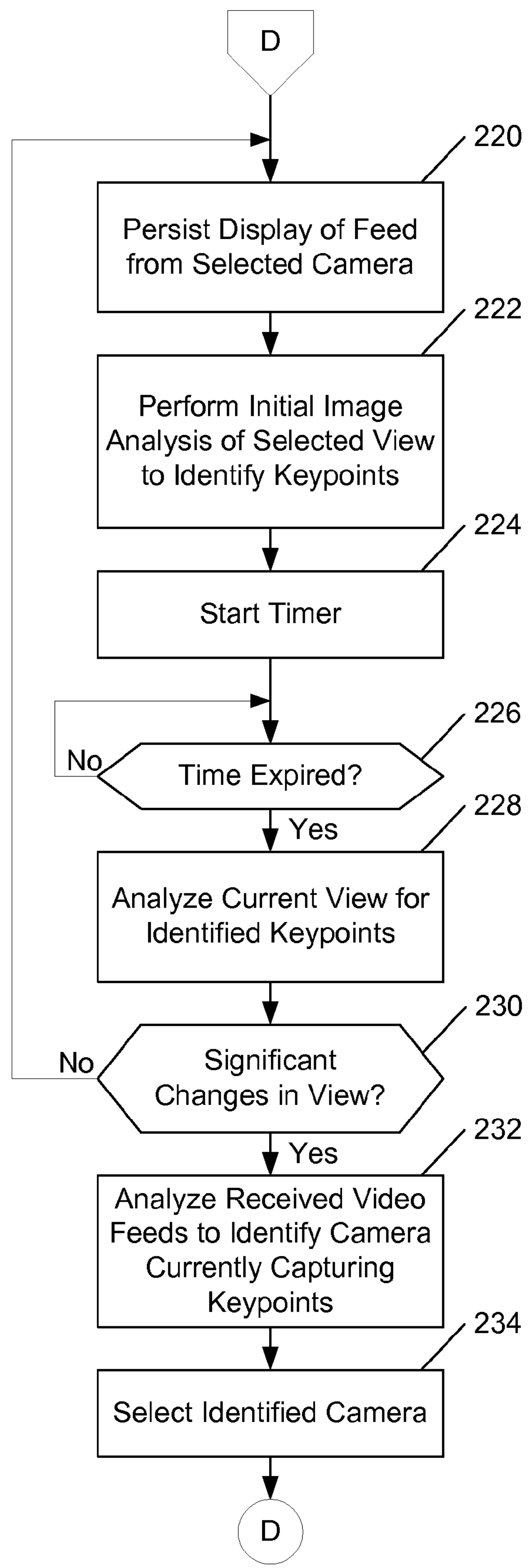
Figure 12:
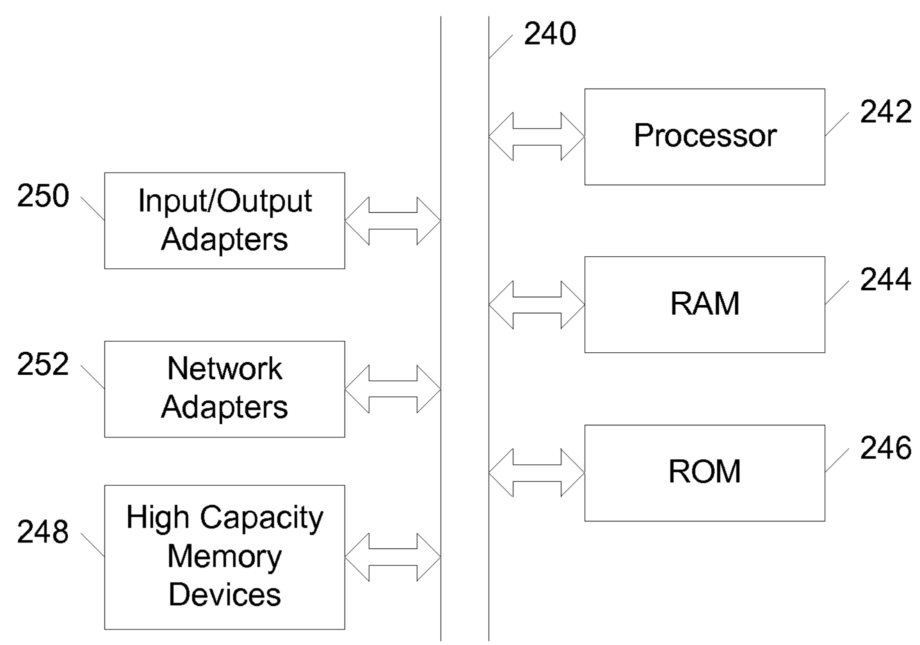
FIG. 12 is a functional block diagram of the hardware infrastructure of a programmable general-purpose computer device that could be used in implementing the present invention.

The driver selection operations using the input device 120 are part of a process illustrated in flowchart form in FIG. 11, consisting of FIGS. 11A, 11B and 11C. The process is initiated in a step 180 when the driver selects the soft button on the top-level menu that triggers the process of building a guided scan strategy. The system then checks (operation 182) whether the driver has chosen to consider video feeds from all participating vehicles in building the strategy. If that choice is found to have been registered, the process jumps to a second phase (described below) beginning at the input to an operation 188. If it is not detected that the driver has chosen to consider video feeds from all vehicles, the system then determines (operation 184) whether the driver has already made the choice to consider only video feeds from cameras mounted on the driver's own vehicle. If no such a choice has been registered, the process enters a loop consisting of operations 182 and 184 and does not leave that loop until the system detects that the driver has made one choice or the other.

If the driver chooses to limit the video feeds to those provided by cameras mounted on the driver's own vehicle, the next choice (operation 186) the driver has to make is whether to automatically cycle through all of those feeds (i.e., to perform a 360° video sweep). If the driver elects to cycle through all of the video feeds generated by "local" cameras, then a camera set including all of the vehicle-mounted cameras is selected in an operation 198. Otherwise, the process enters a selection-refining phase in which the driver may limit the video feeds to be considered to forward-facing cameras (operation 188), rear-facing cameras (operation 190), left-facing cameras (operation 192), or right-facing cameras (operation 194). The selection-refining phase culminates in the selection (operation 196) of a defined camera set, the set being all cameras that produce video feeds having properties defined by the prior selection steps.

Once a desired set of video feeds (cameras) is defined, the system begins what could be described as a video "slideshow" (operation 200) in which a video feed from each camera in the set is presented on an in-vehicle display for a limited period of time to give the driver time to review the presented video feed and decide whether the video feed is the one of greatest current interest. There is always a possibility that the driver may decide the current set of video feeds are not really of interest and will want to adjust the scanning strategy. When the driver selects the appropriate soft button or otherwise inputs an "adjust strategy" command (operation 202), adjustments (operations 204) can be made in the scan strategy to redefine the set of a video feeds used for the video slideshow.

Referring momentarily to FIG. 11B, examples of the types of adjustments that can be made include a jump left instruction (operation 204*a*), a jump right instruction (operation 204*b*), a restart scan instruction (operation 204*c*) or a reverse presentation order instruction (operation 204*d*). The properties of each of these instructions have already been described.

Once the video slideshow begins, the system monitors the user input system (operation 206) for user input finally identifying the view or video feed currently of the greatest interest to the user. The video slideshow will continue, perhaps with scanning strategy adjustments by the user, until the user selects the video feed currently of greatest interest. In one embodiment of the invention, the user must make one additional choice even after the video feed currently of greatest interest is identified. If the user based his selection on the fact the video feed contains a particular image in which the driver is interested (e.g., a roadside accident), the driver may instruct (operation 208) the system to continue to provide feeds of that image even if it means switching to different cameras. As an alternative, the driver may be more interested in maintaining the view from a particular camera rather than of a particular image. In that case, the driver may enter a Camera Lock instruction (operation 210) that will result in the system persisting the display of the video feed produced by the selected camera (operation 212), regardless what that video feed shows.

Assuming the driver is more interested in maintaining video feeds showing a particular image, as evidenced by entry of a View Lock instruction in operation 208, process steps of the type shown in FIG. 11C are performed. Initially, the system causes a persistent display (operation 220) of the video feed from the selected video camera. Image analysis is performed (operation 222) on the video feed to identify keypoints (e.g., particular buildings, particular vehicles, etc.) in the image being presented. Once the keypoints have been identified, an interval timer is initialized and started (operation 224) and allowed to run until it is determined the interval has expired (operation 226). Once the interval expires, the image currently being displayed is again analyzed (operation 228) to determine whether it continues to include the previously identified keypoints. If it is determined (operation 230) that significant changes have occurred in the images now being generated by the originally-selected camera, the system will begin to analyze video feeds received from other cameras (operation 232) to identify at least one video camera that is currently producing a video feed that shows the keypoints of interest. The video camera identified in operation 232 is then selected (operation 234) as the source video feed to be persisted and the entire process shown in FIG. 11C is repeated but now using the newly selected camera to provide the persisted display.

If the driver has selected the View Lock option for the display to be persisted, the system will attempt to switch automatically to different cameras on different vehicles so as to maintain a display showing the image originally of interest to the driver, at least until no video feeds can be found that include the image or until the driver manually terminates the View Lock process.

The invention may be implemented through the use of special-purpose hardware of the type functionally described earlier. Alternatively, the invention may be implemented by programming a general purpose computer device having an infrastructure of the type illustrated in FIG. 9. The infrastructure includes a system bus 240 that carries information and data among a plurality of hardware subsystems including a processor 242 used to execute program instructions received from computer applications running on the hardware. The infrastructure also includes random access memory (RAM) 244 that provides temporary storage for program instructions and data during execution of computer applications and are read only memory (ROM) 246 often used to store program instructions required for proper operation of the device itself, as opposed to execution of computer applications. Long-term storage of programs and data is provided by high-capacity memory devices 248, such as magnetic hard drives or optical CD or DVD drives.

In a typical computer system, a considerable number of input/output devices are connected to the system bus 240 through input/output adapters 250. Commonly used input/output devices include monitors, keyboards, pointing devices and printers. Increasingly, high capacity memory devices are being connected to the system through what might be described as general-purpose input/output adapters, such as USB or FireWire adapters. Finally, the system includes one or more network adapters 252 that are used to connect the system to other computer systems through intervening computer networks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

For example, while the invention has been described for use in a V2V network, it obviously has applicability to other networks where multiple video cameras may share video data; e.g., multi-camera video surveillance systems. Moreover, while only a touch-sensitive display is described as a mechanism for capturing driver choices in developing a guided scan strategy, alternative technologies could be used for the same purpose. One example of such an alternative technology would be a voice recognition system that would provide audio prompts to a driver and then receive and decode the driver's audible responses.

Having thus described the invention of the present application in detail and by reference to preferred embodiments thereof, it will be apparent that modifications and variations are possible without departing from the scope of the invention defined in the appended claims.

What is claimed is:

1. For use in a vehicle-to-vehicle network wherein multiple participating vehicles include video cameras producing video data that may be shared among all participating vehicles, a method of enabling a user of one of the participating vehicles to guide a selection of a desired video feed from a plurality of available video feeds, said method comprising:

receiving from a first user a user-designated viewing strategy comprising at least one defined view property including a view direction;

automatically selecting from among the plurality of available video feeds one or more video feeds possessing the defined view property including the view direction;

automatically presenting video from each of the selected video feeds possessing the defined view property including the view direction on an in-vehicle video display associated with the first user for a limited period of time to enable the first user to view a first portion of the video from each of the selected video feeds and to enable each of the selected video feeds to replace one another based on the limited period of time;

receiving from the first user a user selection of a video feed of interest made during presentation of the video from said video feed of interest on the in-vehicle video display associated with the first user;

in response to the user selection, persisting the presentation of the video from said video feed of interest on the in-vehicle video display to enable the first user to view more than the first portion of the video from said video feed of interest;

periodically checking both the persisted presentation of the video from said video feed of interest on the in-vehicle video display and other received video feeds for the view property including the view direction defined in the user-designated viewing strategy;

in response to a determination that the persisted presentation of the video from said video feed of interest on the in-vehicle video display has ceased to possess the view property including the view direction, terminating the persisted presentation; and in response to a determination that another received video feed possesses the view property including the view direction, initiating persisted presentation of video from said another received video feed on the in-vehicle display.

2. The method according to claim 1, further comprising terminating the persisted presentation of the video from said video feed of interest on the in-vehicle video display in response to receipt of a different user-designated viewing strategy.

3. The method according to claim 2, further comprising:

automatically selecting a different video feed in response to the receipt of the different user-designated viewing strategy;

terminating the presentation of video from a currently selected video feed of interest; and initiating presentation of video from said selected different video feed on the in-vehicle display.

4. The method according to claim 1, further comprising:

automatically selecting a different video feed in response to receipt of a different user-designated viewing strategy;

terminating the presentation of video from a currently selected video feed of interest; and initiating presentation of video from said selected different video feed on the in-vehicle display.

5. A computer program product to enable a user of a participating vehicle in a vehicle-to-vehicle network to guide a selection of a desired video feed from among a plurality of video feeds shared by multiple participating vehicles in the vehicle-to-vehicle network, said computer program product comprising a computer usable medium having computer usable program code embodied therewith, said computer usable program code comprising:

computer usable program code configured to receive a user-designated viewing strategy from a first user comprising at least one defined view property including a view direction;

computer usable program code configured to automatically select, from among the plurality of available video feeds, each video feed possessing the defined view property including the view direction in the user-designated viewing strategy;

computer usable program code configured to automatically present video from each of the selected video feeds possessing the defined view property including the view direction on an in-vehicle video display associated with the first user for a first period of time for review by the first user and to enable each of the selected video feeds to replace one another based on the first period of time;

computer usable program code configured to receive from the first user a user selection of a video feed of interest made during presentation of the video from said video feed of interest on the in-vehicle video display associated with the first user;

computer usable program code configured to, in response to the user selection, persist the presentation of the video from said video feed of interest on the in-vehicle video display associated with the first user for longer than the first period of time;

computer usable program code configured to periodically check both the persisted presentation of the video from said video feed of interest on the in-vehicle video display and other received video feeds for the view property including the view direction defined in the user-designated viewing strategy;

computer usable program code configured to, in response to a determination that the persisted presentation of the video from said video feed of interest on the in-vehicle video display has ceased to possess the view property including the view direction, terminate the persisted presentation; and computer usable program code configured to, in response to a determination that another received video feed possesses the view property including the view direction, initiate persisted presentation of video from said another received video feed on the in-vehicle display.

6. The computer program product according to claim 5, further comprising computer usable program code configured to terminate the persisted presentation of the video from said video feed of interest on the in-vehicle video display in response to receipt of a different user-designated viewing strategy.

7. The computer program product according to claim 6, further comprising:

computer usable program code configured to automatically select a different video feed in response to the receipt of the different user-designated viewing strategy;

computer usable program code configured to terminate the presentation of video from a currently selected video feed of interest; and computer usable program code configured to initiate presentation of video from said selected different video feed on the in-vehicle display.

8. The computer program product according to claim 5, further comprising:

computer usable program code configured to automatically select a different video feed in response to receipt of a different user-designated viewing strategy;

computer usable program code configured to terminate the presentation of video from a currently selected video feed of interest; and computer usable program code configured to initiate presentation of video from said selected different video feed on the in-vehicle display.

9. In a vehicle-to-vehicle network wherein multiple participating vehicles include video cameras producing video feeds that may be shared among all participating vehicles, a video selection system for enabling a user of one of the participating vehicles to guide a selection of a desired video feed from a plurality of available streams of video data, said system comprising:

a user input system for receiving from a first user a user-designated viewing strategy comprising at least one defined view property including a view direction;

a view selection system for automatically selecting, from among the plurality of available video feed, each video feed possessing the defined view property including the view direction in the user-designated viewing strategy; and display control logic for automatically presenting video from each of the selected video feeds possessing the defined view property including the view direction on an in-vehicle video display associated with the first user for a limited period of time for review by the user and to enable each of the selected video feeds to replace one another based on the limited period of time, wherein said user input system includes logic for receiving a user selection of a video feed of interest made during presentation of the video from said video feed of interest on the in-vehicle video display and said display control logic includes logic, responsive to the user selection, to persist the presentation of the video from said video feed of interest on the in-vehicle video display associated with the first user for longer than the limited period of time, and wherein said view selection system further comprises logic for periodically checking both the persisted presentation of the video from said video feed of interest on the in-vehicle video display and other received video feeds for the view property including the view direction defined in the user-designated viewing strategy and said display control logic further includes logic, responsive to a determination that the persisted presentation of the video from said video feed of interest on the in-vehicle video display has ceased to possess the view property including the view direction, for terminating the persisted presentation, and logic, responsive to a determination that another received video feed possesses the view property including the view direction, for initiating persisted presentation of video from said another received video feed on the in-vehicle display.

10. The system according to claim 9, wherein said display control logic further includes logic for terminating the persisted presentation of the video from said video feed of interest on the in-vehicle video display in response to receipt of a different user-designated viewing strategy.

11. The system according to claim 10, wherein said viewer selection system further comprises logic for automatically selecting a different video feed in response to the receipt of the different user-designated viewing strategy and said display control logic further comprises logic for terminating the presentation of video from a currently selected video feed of interest and initiating presentation of video from said selected different video feed on the in-vehicle display.

12. The system according to claim 9, wherein said viewer selection system further comprises logic for automatically selecting a different video feed in response to receipt of a different user-designated viewing strategy and said display control logic further comprises logic for terminating the presentation of video from a currently selected video feed of interest and initiating presentation of video from said selected different video feed on the in-vehicle display.

13. The method according to claim 1, further including:

receiving the user-designated viewing strategy comprising the at least one defined view property further including a vehicle choice, wherein the vehicle choice is based on an option to consider a video feed from a vehicle associated with the first user and an option to consider a video feed from other participating vehicles in the vehicle-to-vehicle network; and applying the at least one defined view property to automatically select from among the plurality of available video feeds and to automatically present in a video slideshow a first portion of the video from each of the selected video feeds based on the view direction and the vehicle choice.

14. The method according to claim 1, further comprising:

analyzing the video from said video feed of interest to identify a feature of interest; and automatically switching, on the in-vehicle display, the video from said video feed of interest to video from one other video feed when said video feed of interest no longer possesses the feature of interest and the one other video feed possesses the feature of interest.

* * * * *